United States Patent
Foote et al.

(10) Patent No.: US 9,596,518 B2
(45) Date of Patent: *Mar. 14, 2017

(54) SYSTEM AND METHOD FOR SEARCHING AN INTERNET NETWORKING CLIENT ON A VIDEO DEVICE

(71) Applicant: THOMSON LICENSING, Issy de Moulineaux (FR)

(72) Inventors: Evan Michael Foote, Appleton, WI (US); Martin Vincent Davey, Indianapolis, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,479

(22) Filed: Mar. 26, 2015

(65) Prior Publication Data
US 2015/0201243 A1  Jul. 16, 2015

Related U.S. Application Data

(63) Continuation of application No. 13/387,199, filed as application No. PCT/US2010/044238 on Jun. 3, 2010, now Pat. No. 9,009,758.
(Continued)

(51) Int. Cl.
*H04N 21/4788*  (2011.01)
*G06F 17/30*  (2006.01)
(Continued)

(52) U.S. Cl.
CPC ..... *H04N 21/4788* (2013.01); *G06F 3/04842* (2013.01); *G06F 17/30796* (2013.01);
(Continued)

(58) Field of Classification Search
CPC .......... H04N 21/4316; H04N 21/4532; H04N 21/4788; H04N 21/4622; H04N 21/4882
See application file for complete search history.

(56) References Cited

U.S. PATENT DOCUMENTS

2005/0262542 A1* 11/2005 DeWeese ............ H04L 12/1818
725/106
2008/0066100 A1* 3/2008 Brodersen ......... G06F 17/30855
725/35
(Continued)

FOREIGN PATENT DOCUMENTS

EP        0848554      6/1998
JP       2005115790   4/2005
(Continued)

OTHER PUBLICATIONS

Ikeda, "Operation Techniques You Should Know, You fail unless you score 90% or more!? Leopard Graduation Examination", Mac People, vol. 15, No. 7, p. 43, Jun. 2, 2009.

*Primary Examiner* — Pinkal R Chokshi
(74) *Attorney, Agent, or Firm* — Brian J. Dorini; Michael A. Pugel; Ivonete Markman

(57) ABSTRACT

A system and method for enabling a user to display and interact with a social networking structure on a video device connected to a network enabled host device is provided. A user interface (UI) is also provided for displaying content (e.g. messages or tweets) that is output in an overlay for display on a display while program video is playing. The method provides for accessing a social networking site in response to a user input, the user input initiated while outputting a program for display, generating at least one keyword for searching the social networking site based on at least one characteristic associated with the program, retrieving content from the social networking site based the at least
(Continued)

one keyword and outputting the retrieved content in an overlay for display simultaneous with the program.

24 Claims, 8 Drawing Sheets

Related U.S. Application Data

(60) Provisional application No. 61/232,196, filed on Aug. 7, 2009.

(51) Int. Cl.
*H04N 7/173* (2011.01)
*H04N 21/442* (2011.01)
*H04N 21/45* (2011.01)
*G06F 3/0484* (2013.01)
*H04L 12/58* (2006.01)
*H04N 21/2668* (2011.01)
*H04N 21/482* (2011.01)
*H04N 21/81* (2011.01)
*H04N 21/431* (2011.01)
*H04N 21/462* (2011.01)

(52) U.S. Cl.
CPC ........ *G06F 17/30817* (2013.01); *H04L 51/32* (2013.01); *H04N 7/17318* (2013.01); *H04N 21/2668* (2013.01); *H04N 21/4312* (2013.01); *H04N 21/4314* (2013.01); *H04N 21/44222* (2013.01); *H04N 21/4532* (2013.01); *H04N 21/4828* (2013.01); *H04N 21/812* (2013.01); *H04N 21/4316* (2013.01); *H04N 21/4622* (2013.01)

(56) References Cited

U.S. PATENT DOCUMENTS

| | | |
|---|---|---|
| 2008/0112690 A1 | 5/2008 | Shahraray et al. |
| 2008/0189736 A1 | 8/2008 | Edwards et al. |
| 2009/0063995 A1 | 3/2009 | Baron et al. |
| 2009/0119717 A1 | 5/2009 | Newton et al. |
| 2009/0132527 A1 | 5/2009 | Sheshagiri et al. |
| 2009/0199275 A1 | 8/2009 | Brock et al. |
| 2009/0249244 A1 | 10/2009 | Robinson et al. |
| 2009/0322652 A1 | 12/2009 | Adderton et al. |
| 2010/0037277 A1 | 2/2010 | Flynn-Ripley et al. |
| 2010/0146560 A1* | 6/2010 | Bonfrer ............ H04N 21/43637 725/62 |
| 2010/0162312 A1 | 6/2010 | Heilbron |
| 2010/0205541 A1* | 8/2010 | Rapaport ............... G06Q 10/10 715/753 |
| 2010/0235375 A1 | 9/2010 | Sidhu et al. |
| 2010/0242074 A1 | 9/2010 | Rouse et al. |
| 2010/0287592 A1 | 11/2010 | Patten et al. |
| 2010/0293170 A1 | 11/2010 | Hall et al. |
| 2010/0293575 A1* | 11/2010 | Biniak ............... H04N 5/44543 725/40 |
| 2010/0319034 A1* | 12/2010 | Mountain .......... H04N 5/44513 725/68 |
| 2010/0329642 A1 | 12/2010 | Kam et al. |
| 2012/0124475 A1 | 5/2012 | Foote et al. |
| 2013/0091523 A1* | 4/2013 | McCarthy ............ G11B 27/034 725/46 |

FOREIGN PATENT DOCUMENTS

| | | |
|---|---|---|
| JP | 2008028529 | 2/2008 |
| JP | 2009157460 | 7/2009 |
| WO | WO0211446 | 2/2002 |
| WO | WO2004053732 | 6/2004 |

\* cited by examiner

SYSTEM AND METHOD FOR SEARCHING AN INTERNET NETWORKING CLIENT ON A VIDEO DEVICE

REFERENCE TO RELATED PROVISIONAL APPLICATION

This application is a continuation of applicant's co-pending U.S. application Ser. No. 13/387,199, filed Jan. 26, 2012 which claims the benefit under 35 U.S.C. §365 of International Application No. PCT/US2010/44238, filed Aug. 3, 2010, which claims the benefit under 35 U.S.C. §119 of U.S. provisional application 61/232,196, which was filed on Aug. 7, 2009.

TECHNICAL FIELD OF THE INVENTION

The present disclosure generally relates to digital content systems and the internet, and more particularly, to a system and method for enabling a user to display and interact with an internet site, such as a social networking structure, on a video device connected to a network enabled host device.

BACKGROUND OF THE INVENTION

The world of the internet and the world of video entertainment continue to merge, forming the potential for many new opportunities in structures, devices and applications. Many of these applications may be capable of providing improved convenience of one or more of the activities associated with the internet, when coupled with a video entertainment device, such as a set-top box or television. One such activity is social networking through an internet site.

Many internet social networking uses, such as microblogging, revolve around remaining in contact with others in the social network, while carrying on other activities. The social networking interfaces typically involve separate devices, such as a smart phone or personal computer. However, people may also wish to stay connected while being entertained, while watching a television program, or watching a movie while in their home.

Therefore, a need exists for techniques for allowing a user to display and interact on a social network enabled client host connected to their television (TV) or set-top box without the necessity of any additional interface, such as a smart phone or personal computer (PC).

SUMMARY

According to an aspect of the present disclosure, a method for searching content on a social networking site is provided. The method includes accessing the social networking site in response to a user input, the user input initiated while causing a program to be shown on a display; generating at least one keyword for searching the social networking site based on at least one characteristic associated with the program, retrieving content from the social networking site based the at least one keyword, and outputting the retrieved content in an overlay for display on the display device simultaneous with the program.

According to another aspect of the present disclosure, a system for searching content on a social networking site includes a receiver that accesses the social networking site in response to a user input, the user input initiated while causing a program to be shown on a display device, a controller that generates at least one keyword for searching the social networking site based on at least one characteristic associated with the program and retrieves content from the social networking site based the at least one keyword, and a display interface that outputs the retrieved content in an overlay for display on the display device simultaneous with the program.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
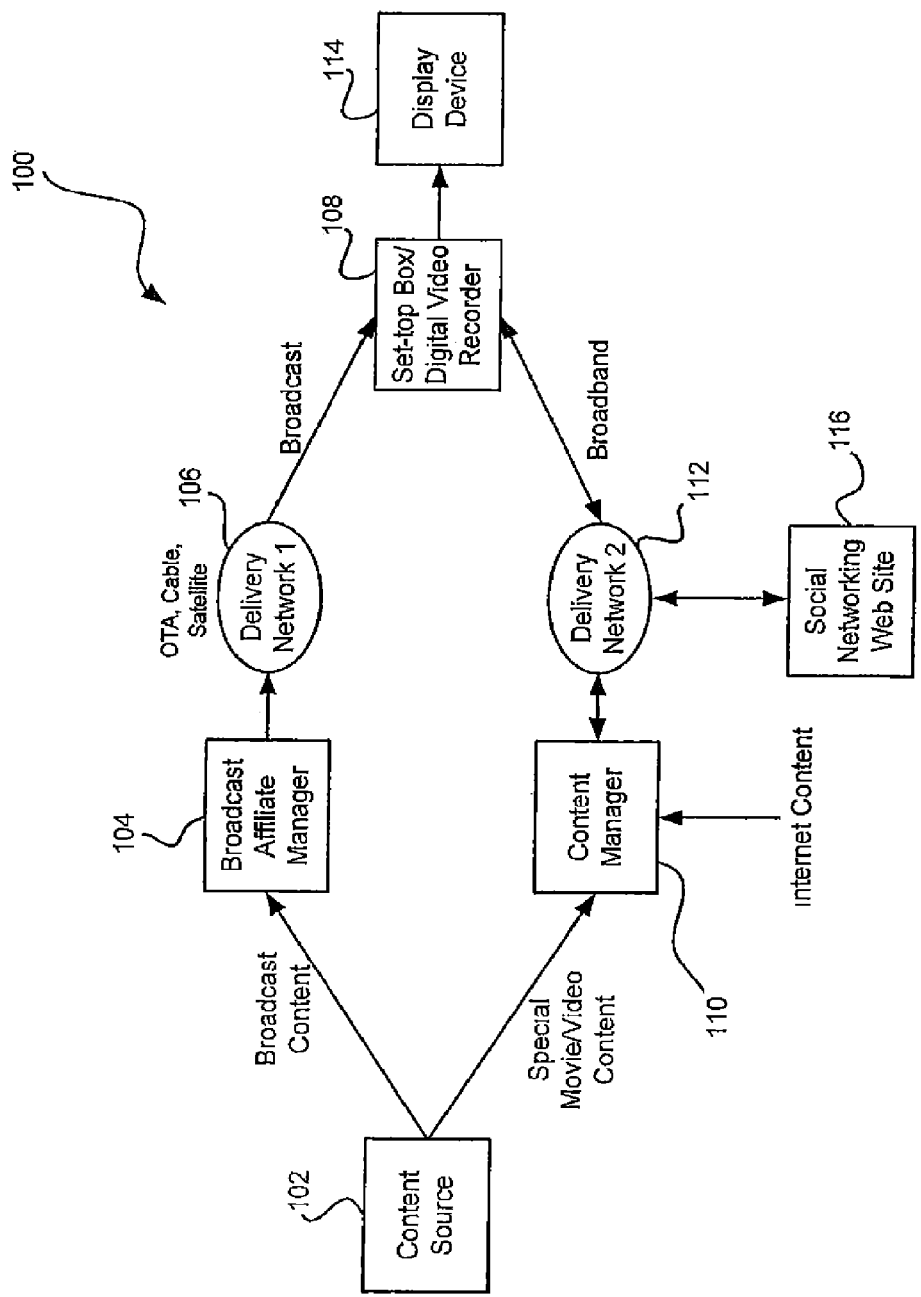
FIG. 1 is a block diagram of an exemplary system for delivering video content in accordance with the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure relates to a system and method that allows a user to display and enter messages through an internet social networking structure, program, or website, such as twitter, on a video display such as a television, through a connection to an Internet enabled host, such as a set-top box that is also capable of displaying video delivered through a video broadcast network, such as a cable or satellite network. First, a user interface (UI) is provided for displaying the content (e.g., tweets) in a box or overlay on the screen while program video is playing. The UI includes the ability to access multiple profiles for determining whose messages to display, and also includes a carouselling, or rotating, message display system, with a current message surrounded above and below by a previous and next message in the display queue in a smaller font or size. Furthermore, a search mechanism is provided for accessing and retrieving the messages. The search may include identifying information, such as keywords, germane to the current program being viewed. The search may also include user input to search for specific keywords in content, including the current broadcast content (e.g., closed caption data) or advertising.

In order to provide a high value service to end consumers, it is desirable for a video delivery service to provide access to a broad range of content, for example, social networking web sites. As social networking on the Internet becomes more and more popular, new posting and viewing mechanisms are needed. The embodiments below describe a system and method of displaying and posting content, e.g., messages, provided through a social networking system on a display device, e.g., a television. FIG. 1 shows a block diagram of an exemplary system 100, and includes a host device 108, with an interface to a broadcast delivery network 106 and an interface to a broadband delivery network 112, e.g., the internet. The host device 108 may be a set-top box (STB) device, where the host device 108 also connects to a TV for video display. The host device 108, such as a STB, may output or otherwise cause a video program to be shown on the TV for video display. The host device 108 allows an over-the-top interface to interact with the social networking service on an internet site. The host device may be a cable STB, internet protocol (IP) STB, or satellite STB with each capable of including an application interface to a social networking client for an internet site.

Initially, systems for delivering various types of content to a user will be described. Subsequently, a user interface and method for displaying and posting content (e.g., messages) provided through a social networking system on an internet website in accordance with embodiments of the present disclosure will then be detailed.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting Systems (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a user's set top box/digital video recorder (DVR) 108 in a user's home, where the content will subsequently be displayed to the user.

A second form of content is referred to as special content. Special content may include content delivered as premium viewing, pay-per-view, or other content otherwise not provided to the broadcast affiliate manager. In many cases, the special content may be content requested by the user. The special content may be delivered to a content manager 110. The content manager 110 may be a service provider, such as an internet website, affiliated, for instance, with a content provider, broadcast service, or delivery network service. The content manager 110 may also incorporate internet content into the delivery system, or explicitly into a search only such that content may be searched that has not yet been delivered to the user's set top box/digital video recorder 108. The content manager 110 may deliver the content to the user's set top box/digital video recorder 108 over a separate delivery network, delivery network 2 (112). Delivery network 2 (112) may include high-speed broadband internet type communications systems. It is important to note that the content from the broadcast affiliate manager 104 may also be delivered using all or parts of delivery network 2 (112) and content from the content manager 110 may be delivered using all or parts of Delivery network 1 (106). In addition, the user may also obtain content directly from the internet via delivery network 2 (112) without necessarily having the content managed by the content manager 110. For example, the user may obtain content from web sites hosted on various servers, where the servers are coupled to Delivery network 2 (112) without passing through content manager 110. In one embodiment, server 116 will host a social networking internet web site.

The set top box/digital video recorder 108 may receive different types of content from one or both of delivery network 1 and delivery network 2. The set top box/digital video recorder 108 processes the content, and provides a separation of the content based on user preferences and commands. The set top box/digital video recorder may also include a storage device, such as a hard drive or optical disk drive, for recording and playing back audio and video content. Further details of the operation of the set top box/digital video recorder 108 and features associated with playing back stored content will be described below in relation to FIG. 2. The processed content is provided to a display device 114. The display device 114 may be a conventional two-dimensional (2-D) type display or may alternatively be an advanced three-dimensional (3-D) display. It should be appreciated that other devices having display capabilities such as wireless phones, personal digital assistants (PDAs), computers, gaming platforms, remote controls, multi-media players, or the like, may employ the teachings of the present disclosure and are considered within the scope of the present disclosure.

Figure 2:
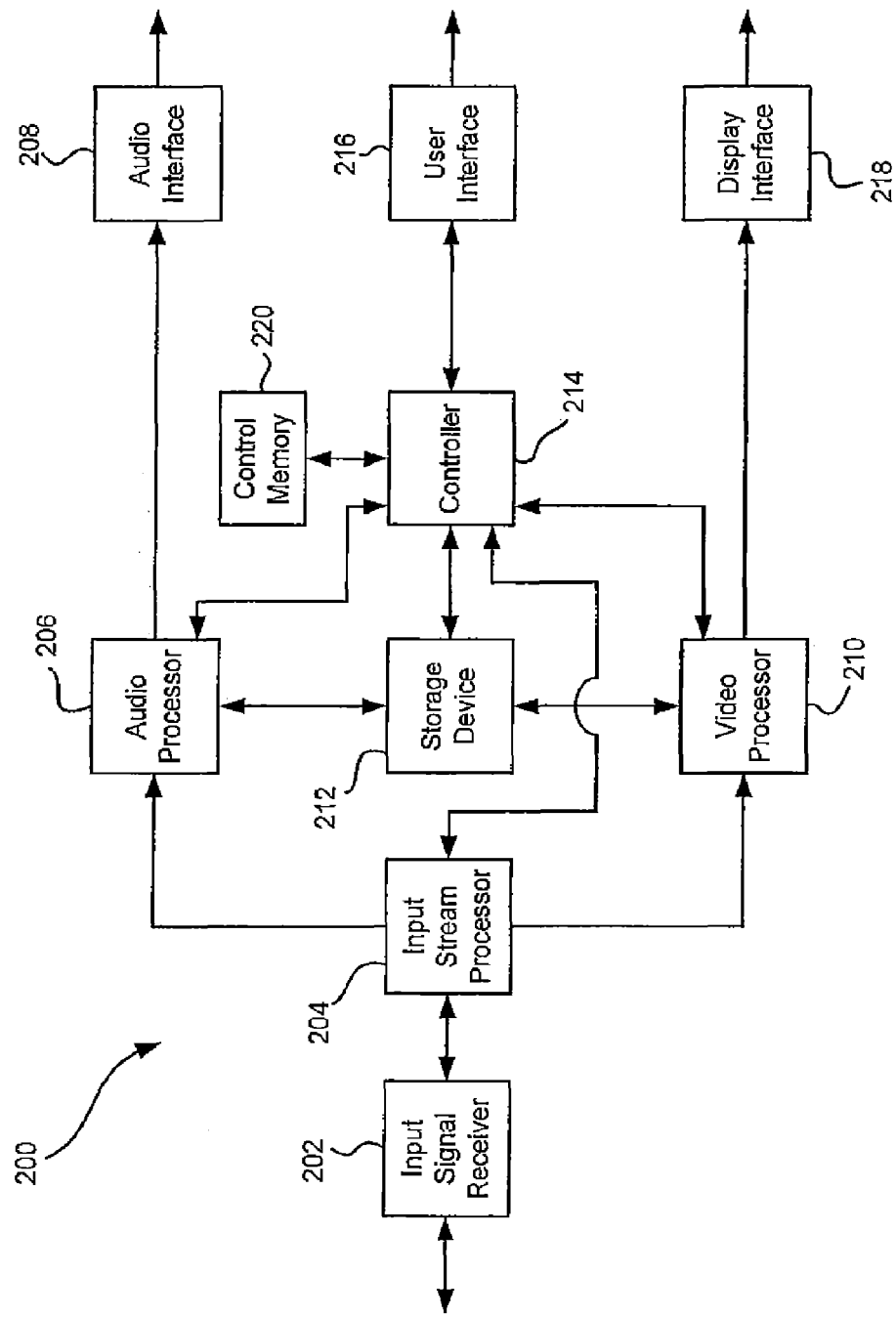
FIG. 2 is a block diagram of an exemplary set-top box/host device in accordance with the present disclosure.

Turning now to FIG. 2, a block diagram of an embodiment of the core of a set top box/host device 200 is shown. The device 200 shown may also be incorporated into other systems including the display device 114 itself. In either case, several components necessary for complete operation of the system are not shown in the interest of conciseness, as they are well known to those skilled in the art.

In the device 200 shown in FIG. 2, the content is received in an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved in the input signal receiver 202 based on user input provided through a control interface (not shown). It is to be appreciated that the input signal receiver 202 may in certain embodiments be a transceiver for two way communication to and from the set top box/digital video recorder 108. In certain embodiments, the transceiver will output information, e.g., a search request to delivery network 2 (112) to search for internet content.

The decoded output signal from the input signal receiver 202 is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device 114 or an audio amplifier (not shown). Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216. The storage device 212 may be a hard disk drive, one or more large capacity integrated electronic memories, such as static random access memory, or dynamic random access memory, or may be an interchangeable optical disk storage system such as a compact disk drive or digital video disk drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the search results or message in an overlay as will be described in more detail below.

Figure 4:
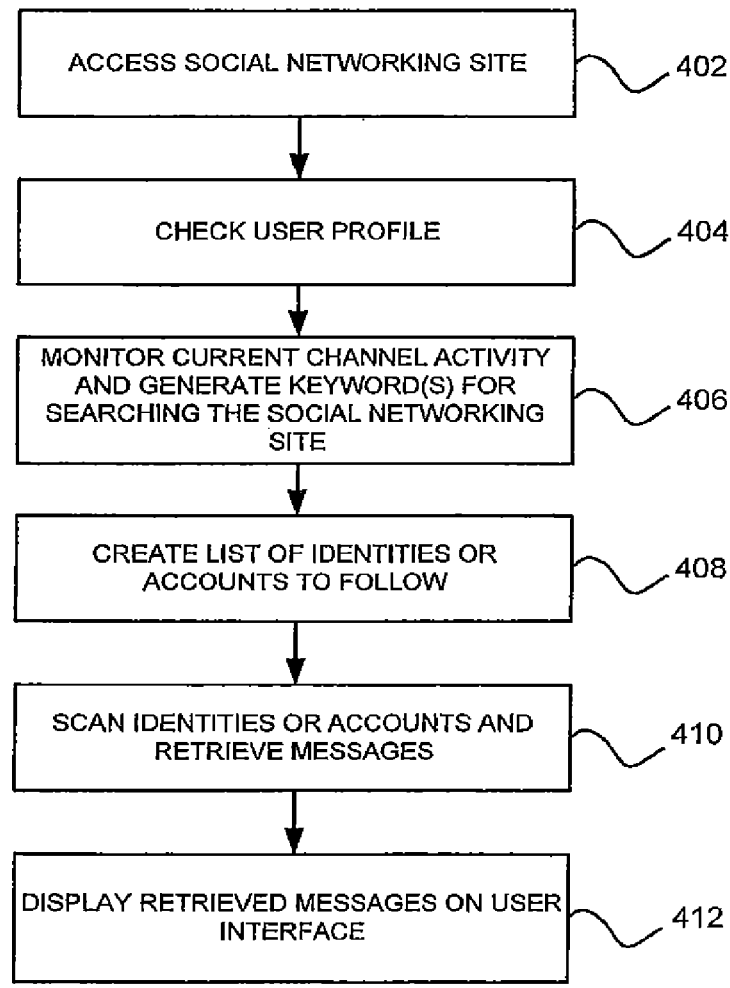
FIG. 4 is a flowchart of an exemplary method for displaying and posting content, e.g., messages, provided through a social networking system included with an internet site in accordance with an embodiment of the present disclosure.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below in relation to FIG. 4, the controller 214 performs searching of content, either stored or to be delivered via the delivery networks described above. The controller 214 is further communicatively connected, or coupled, to control memory 220 (e.g., volatile or nonvolatile memory, including RAM, static RAM (SRAM), dynamic RAM (DRAM), ROM, programmable ROM (PROM), flash memory, electronically programmable ROM (EPROM), electronically erasable programmable ROM (EEPROM), etc.) for storing information and instruction code for controller 214. Further, the implementation of the memory may include several possible embodiments, such as a single memory device or, alternatively, more than one memory circuit communicatively connected, or coupled, together to form a shared or common memory. Still further, the memory may be included with other circuitry, such as portions of bus communications circuitry, in a larger circuit.

To operate effectively, the user interface 216 of the present disclosure employs an input device that moves a cursor around the display. In one embodiment, the input device is a remote controller, with a form of motion detection, such as a gyroscope or accelerometer, which allows the user to move a cursor freely about a screen or display. In another embodiment, the input device is a controller in the form of a touch pad device or other touch sensitive device that will track the user's movement on the pad, and display it on the screen. In yet another embodiment, a conventional remote control device having navigational buttons may be used.

Figure 3:
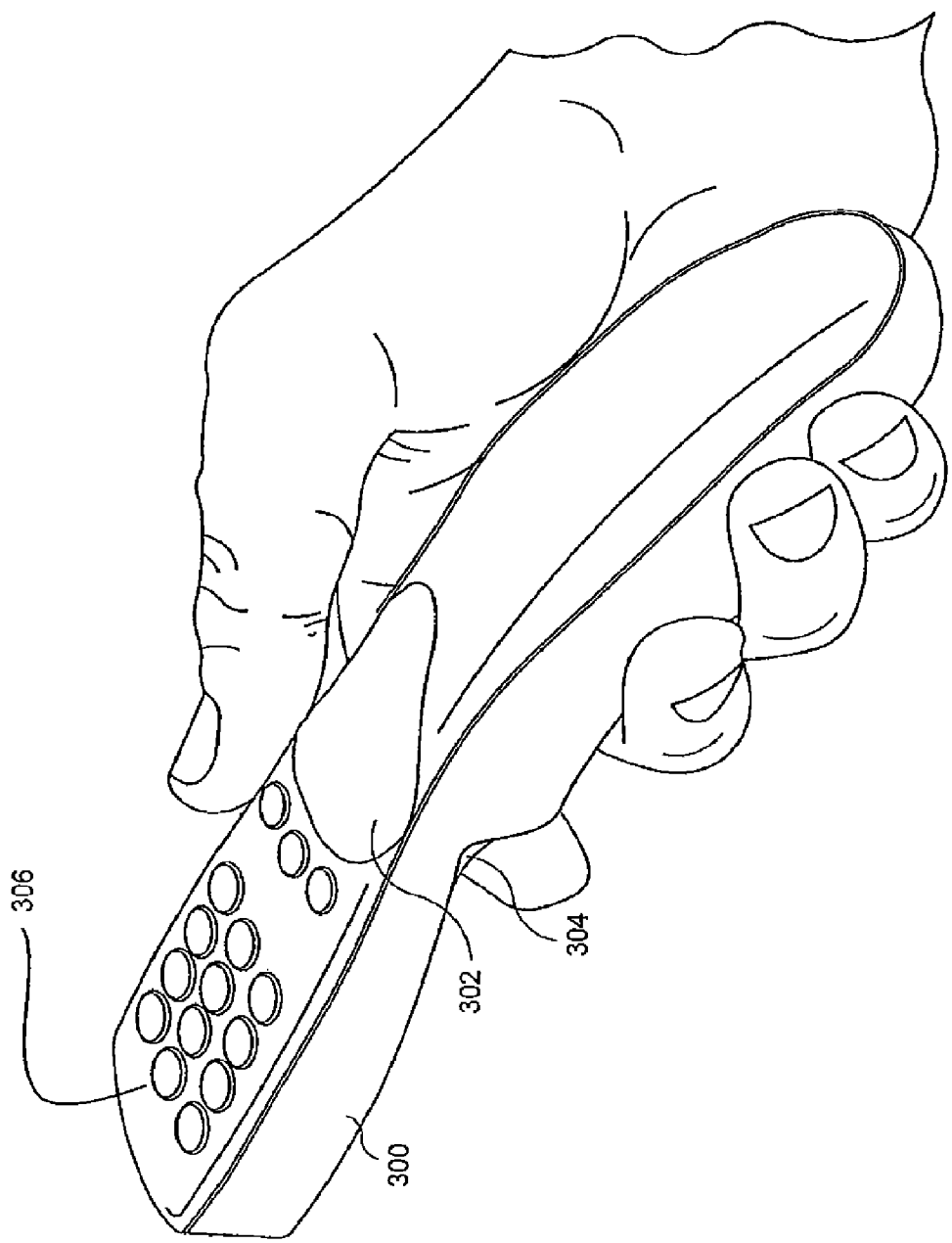
FIG. 3 is a perspective view of an exemplary remote controller in accordance with an embodiment of the present disclosure.

An exemplary hand-held angle-sensing remote controller 300 is illustrated in FIG. 3. Remote controller 300 includes a thumb button 302, positioned on the top side of controller 300 so as to be selectively activated by a user's thumb. Activation of thumb button 302 will also be referred to as a "click," a command often associated with activation or launch of a selected function. Controller 300 further includes a trigger button 304, positioned on the bottom side of controller 300 so as to be selectively activated by a user's index (or "trigger") finger. Activation of trigger button 304 will also be referred to as a "trigger," and angular movement (i.e. pitch, yaw and/or roll) of the controller 300 while the trigger is depressed will be referred to as a "trigger-drag." A trigger-drag command is often associated with movement of a cursor, virtual cursor or other indication of the user's interactive position on the display, such as a change of state (i.e., a highlighted or outlined cell), and is commonly used to navigate in and select entries from the interactive display. Additionally, a plurality of buttons 306 are provided for entering numbers and/or letters. In one embodiment, the plurality of buttons 306 is configured similar to a telephone-type keypad.

The use of a hand-held angle-sensing remote controller provides for a number of types of user interaction. When using an angle-sensing controller, changes in yaw map to left-and-right motions, changes in pitch map to up-and-down motions and changes in roll map to rotational motions along a longitudinal axis of the controller. These inputs are used to define gestures and the gestures, in turn, define specific contextual commands. As such, a combination of yaw and pitch can be used to define any two-dimensional motion, such as a diagonal, and a combination of yaw, pitch and roll can be used to define any three-dimensional motion.

In one embodiment, the host device 108, 200 is interfaced with a head end device in a network, e.g., a cable network, and the internet. The host device 108, 200 receives program content, such as television programs and movies, from the head end over the cable network. The head end also provides a downloadable software application as a client service to the host device. The downloadable application provides the interface for the social networking service provided over the internet. It is important to note that the physical internet interface may be over the same cable or medium that the video content from the head end is provided.

It is to be appreciated that the set top box/digital video recorder includes an operating system and/or a micro instruction code. The various processes and functions described herein may either be part of the micro instruction code or part of the software application (or a combination thereof) which is executed via the operating system. In one embodiment, the software application is tangibly embodied on a program storage device, which may be uploaded to and executed by any set top box/digital video recorder.

The software application, which may be called, for example, ThomTweet, is a software application that may be written in Java language, stored in a memory of the host device, that scans the social networking service for relevant content, often referred to as tweets, based on the video programming content received or viewed at the time, as well as content based on selected profile options. It is to be appreciated that in one embodiment the memory is control memory 220 of FIG. 2 where the instructions stored thereon are executed by controller 214. In another embodiment, the memory and a corresponding processor or controller to perform the scanning or searching may be a separate, stand-alone integrated circuit such as a digital processing processor (DSP) or an application specific integrated circuit (ASIC). The application may be bound, so that the application is specifically linked to a tuned channel in the host set-top box. The application may also be unbound, allowing to be directly invoked by a user regardless of set-top box operation. The application may be downloaded and run specifically based on the channel being viewed. It may also be downloaded as a stand alone application.

A method for displaying and posting content, e.g., messages, provided through a social networking system in accordance with the present disclosure will now be described in relation to FIGS. 4-7.

Initially, in step 402, the software application will start by either being invoked by the user via the user interface or downloaded to the host device 108. Once started, the application will enable the host device 108 to access the social networking site in response to a user input. After, some security checking the application establishes its operation by looking at user profile information, step 404. The user profile will contain settings on how certain aspects of the user interface will be displayed to the user. Furthermore, as will be described in more detail below, the user profile may include priority lists established by the user for prioritizing which identities or accounts are to be followed.

In step 406, while the user is watching or viewing a video, e.g., a movie or television program, the application monitors current channel activity, e.g., which channels are being viewed, which channels are being recorded, which channels are in the user's favorites list, etc. Based on the channel activity of the user, the application generates keywords for searching the social networking site, the details of which will be described below. Based on the generated keywords, the application creates a list of possible social networking identities or accounts to scan for content, step 408. Next, in step 410, the application scans the various identities or accounts on a periodic basis and retrieves and stores some or all of the interactions as messages or tweets. The application will then generate a user interface which will display or present the messages and associated identities to the user, step 412.

Each message or tweet is typically represented as text content limited to less than 140 characters, and may also include a link to a uniform resource locator (URL) or website or to another user profile, identity, or account associated with the network service. The application stores or caches these tweets. It may prioritize the storage based on date, total number, or a user priority. The tweets may be recalled by the user for display on the video screen in conjunction with the current video programming. The tweets may also be instantly displayed when received depending on user preference. The user may also browse through the tweets. The tweets may also be transferred to other devices through, for instance, a home network structure.

Figure 5:
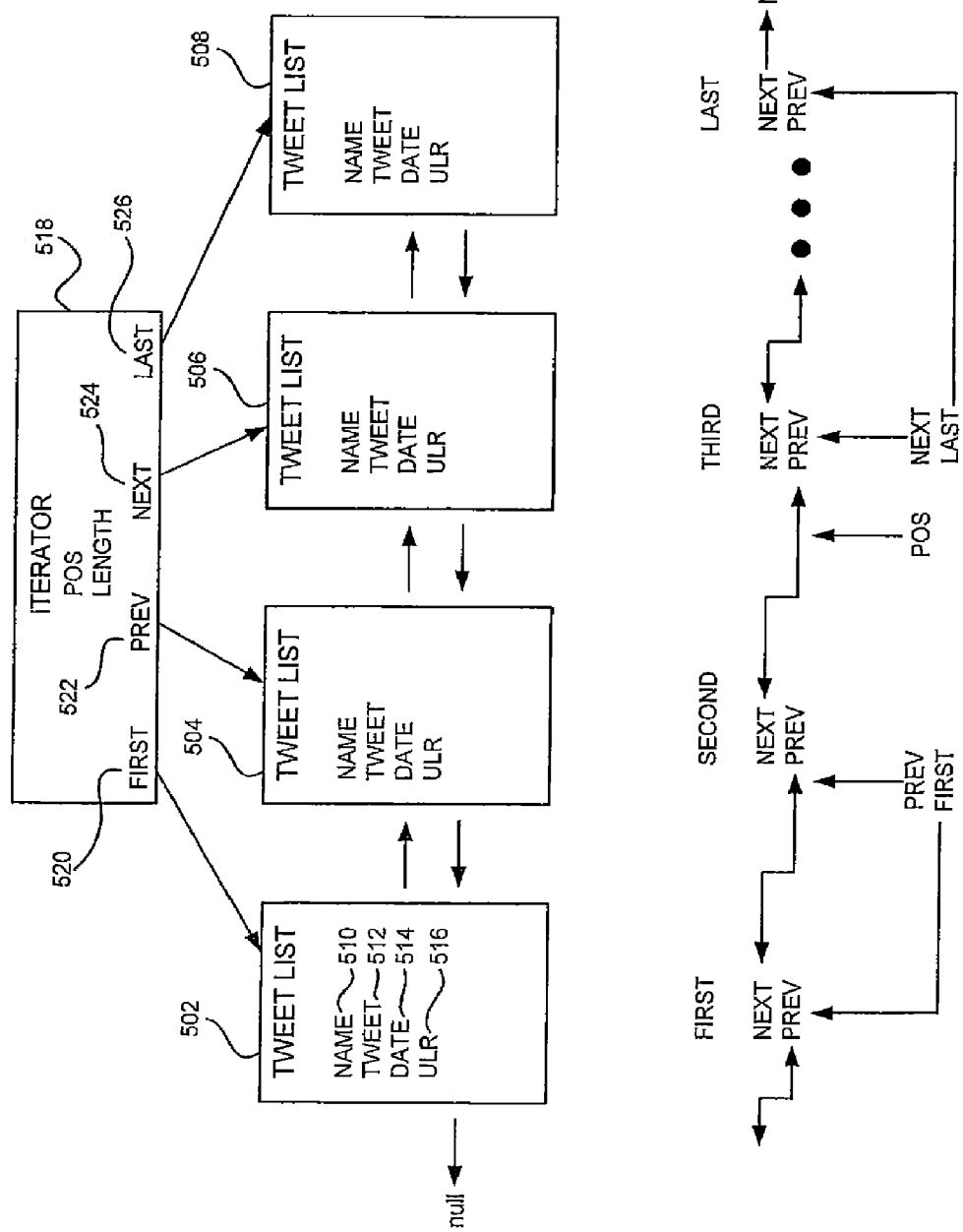
FIG. 5 illustrates a data storage structure for storing messages in accordance with the present disclosure.

FIG. 5 illustrates the data storage structure for the application. As the messages are retrieved and stored in the memory of the host device 108, 200, each message or tweet 502, 504, 506, 508 is saved as a list including a name 510, the message or tweet 512, a date 514 and a URL 516, if necessary, among other pieces of data. All messages 502, 504, 506, 508 are stored in date order. An iterator function 518 pulls each message based on an identity or account selected by the user and reassembles the pulled messages in date order again. The iterator function 518 identifies the first message 520, the last message 526 and links all the messages in between by identifying which message is the previous message 522 and next message 524 relative to each message. In this manner, once a user selects an identity or account to follow, the user can easier scroll forward and backward through the plurality of messages, i.e., tweets. The storage structure facilitates recalling and viewing the individual messages or tweets through a carousel indexing system, or arrangement. It is to be appreciated that other storage structures may be employed in accordance with the principles of the present disclosure.

Figure 6:
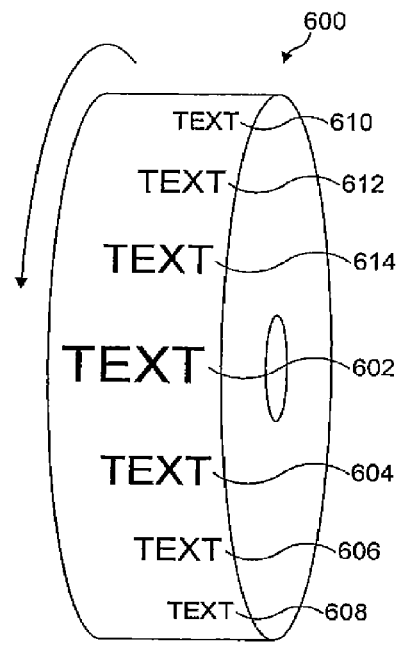
FIG. 6 illustrates a carousel indexing arrangement for displaying messages in accordance with the present disclosure.
Figure 7:
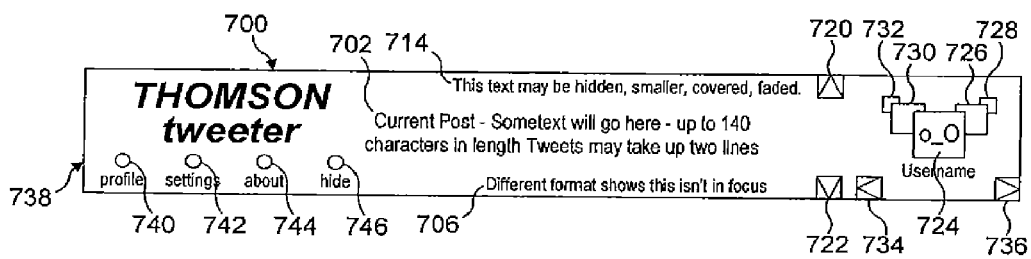
FIG. 7 is an exemplary user interface employing the carousel indexing arrangement in accordance with one embodiment of the present disclosure.

FIGS. 6 and 7 illustrate the carousel indexing arrangement for viewing the messages on a video display, where FIG. 6 illustrates a carousel indexing arrangement and FIG. 7 is an exemplary user interface employing the carousel indexing arrangement. The user may quickly toggle through the stored messages related to a particular set. The set may be identified by the identities or accounts in the social networking system, or site, or may be established through a user profile or user defined parameters. An important property of the carousel arrangement includes the direct viewing of at least one message as a currently displayed message, and may preferably include viewing of the previous message and the next message in the carousel at the same time. Referring to FIG. 6, the currently displayed message 602 is located in the center of the carousel 600 with the largest size font or display area. The previous messages 604, 606, 608 are displayed in a continuously decreasing font or display area size relative to the currently displayed message 602. That is as the message becomes "older" the size or font of message will decrease or get smaller. For example, message 608 is the oldest message displayed so is the smallest in size. Likewise, the next messages 610, 612, 614 increase in size or font as the message approaches the currently displayed message 602. In the example shown in FIG. 6, message 610 is the newest or earliest message shown on the carousel 600 and therefore is the smallest in size or font of the next messages. As the remaining next messages 612, 614 approach the currently displayed message 602, the size of the next messages 612, 614 will increase. It is important to note that although display size or font size is used to represent the carouseling messages, other distinguishing differences may also be used such as color or font type in the message.

Referring to FIG. 7, an exemplary user interface 700 employing the carousel indexing system, or arrangement, is illustrated. It is to be appreciated that the user interface 700 may be placed as an overlay on any portion of the display device 114, e.g., the user interface 700 may be overlaid along a bottom, horizontal portion of the screen of the display device. In other embodiments, the screen of the display device may be segmented into separate portions where the video being viewed is in a first portion and the user interface is in a second portion.

The user interface 700 displays a current message 702 in a first font size with the current message 702 being surrounded above and below by at least one previous message 706 and at least one next message 714 in a font size smaller than the first font size. The first font size may be chosen, or determined, during design or manufacture of device including the user interface 700 or may be selected by the user. The successive displaying of messages may be configured to auto-scroll through the messages with each message being displayed for a predetermined period of time. In addition, the user may control the movement and viewing through the carousel by using remote control commands via arrow icons 720, 722. When arrow icon 720 is activated via the remote controller 300, the messages will scroll upwards revealing previously viewed messages. When arrow icon 722 is activated via the remote controller 300, the messages will scroll downwards revealing previously unviewed or next messages. The indexing may include a one button push single increment operation, and may also include a button hold down carousel index scanning operation, allowing rapid viewing of successive entries.

It is to be appreciated that the number of messages displayed at one time could vary and need not be three messages as shown in the example of FIG. 7. Furthermore, the text of the next and previous message 706, 714 may be hidden, smaller, covered, faded or in a different format to distinguish these messages from the currently displayed message 702.

The user interface 700 further displays at least one identity from the social network site in a second carousel arrangement in the overlay, where the identity is associated to the messages currently being displayed. The at least one identity is represented by various sized predetermined elements. As with the displaying of messages, the identities are displayed in a carousel arrangement so a user can easily switch between various identities the user wants to follow. The identity associated with the currently displayed message 702, i.e., the current identity, is represented by the largest element, in this example element 724. The current identity 724 is then surrounded on each side by at least one previous identity 726, 728 and at least one next identity 730, 732 represented by an element smaller than the first predetermined element, i.e. the current identity 724. Left and right arrow icons, 734 and 736 respectfully, are provided to enable a user, when activated, to switch between various identities that the user is following. When a user switches to a second, different identity, the messages displayed, e.g., messages 702, 706, 714, will change to correspond to the newly selected identity. It is important to note that although display size or font size is used to represent the carouseling identities, other distinguishing differences may also be used such as color, font type, or line type for the identity.

It is to be appreciated that the elements representing the at least one identity may be a picture of the person, e.g., a celebrity, actor, athlete, etc., associated to the identity, an icon, a symbol, etc. Furthermore, the number of elements displayed at one time could vary and need not be five elements as shown in the example of FIG. 7.

The user interface 700 includes a control section 738 for accessing and adjusting various parameters. In one embodiment, the user interface 700 appears as a banner across the bottom of the screen of the display device, but may be adjusted by the user through a graphical profile interface invoked by a "profile" icon 740. Various settings can be changed via commands invoked by a "settings" icon 742.

Table I below provides a listing of commands associated with the graphical user interface. Each of these commands allows for the user to adjust the graphical display as well as alter the current operation mode for the application and also adjust user profile information. Multiple user profiles may be established using the same application. An "about" icon 744 is provided for giving details about the software application, e.g., revision number and date. The interface display may be recalled or hid by a set of user commands via a remote control device invoking the "hide" icon 746.

TABLE I

| Command | Feature |
| --- | --- |
| Start | Option of passing in a list of twitter accounts (specifying advert or related accounts to current programming) |
| Running | Automatically grabs tweets every so often |
| Idle | Displays an advertisement<br>or<br>Auto-scrolls through tweets<br>or<br>Hides off screen |
| User | Pressing up on remote automatically grabs new tweets off twitter |
| Display | Fits text on screen based on words and lines rather than absolute position<br>Shows time as how long ago rather than absolute "posted at this time"<br>Arrows at top and bottom give feedback to let user know the box is getting input<br>Arrows at top and bottom disappear if user is at beginning or end of list |
| Settings | Allow user to change text size, spacing and position<br>Allow user to change text color<br>Allow user to set time zone<br>Allow user to log into their account<br>Allow user to change auto updates<br>Allow user to change box position based on television<br>Allow user to follow topics mentioned<br>Allow user to follow mentioned tweeters<br>Only update graphics when needs to, majority of thread time is spent idling (freeing up resources for other programs in a limited environment |
| Different Size Modes | Allow user to specify how many tweets to view |
| More features | Arrows allow users to look at specific profiles on their following list, display previous 20 updates<br>Post to user's account what the user is watching, i.e., what's on TV<br>Embedded links allow user to view full stories or images |

Figure 8:
FIG. 8 is an exemplary user interface in accordance with another embodiment of the present disclosure.

FIG. 8 illustrates an alternate user interface display 800 associated with a new message. The new message alert feature may be activated through user control. When a new message is posted, the user interface 800 is displayed to a user for a predetermined period of time, e.g., a few seconds. If the user interacts with the user interface 800 via the remote control device 300 within the predetermined time period, the user interface will take the form as shown in FIG. 7, where the user can now scroll through messages and identities. If the user does not interact with the user interface 800 within the predetermined time period, the user interface 800 will disappear until a new message is retrieved.

Figure 9A:
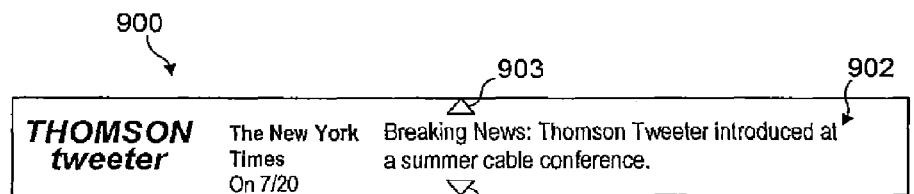
FIGS. 9A and 9B illustrate a viewing feature that allows a size of a message to easily be adjusted within the graphical user interface in accordance with the present disclosure.
Figure 9B:
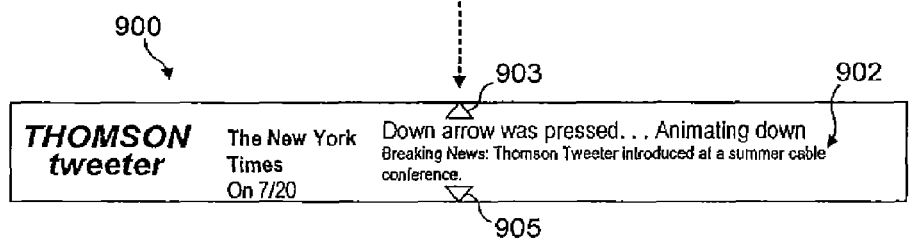

FIG. 9 illustrates a viewing feature that allows the size of the message to easily be adjusted within the graphical interface while in a settings or configuration mode. In FIG. 9A, the user interface 900 displays a current message 902 with arrow icons 903 and 905 for increasing and decreasing the size of the message respectively. FIG. 9B illustrates how the size of the message is smaller than that shown in FIG. 9A after depressing the down arrow icon 905 via the remote control 300.

The system, method and user interface for accessing and displaying content from a social networking service will allow a user to follow friends or family also linked into the social networking service and to keep tabs on their activities while watching TV. As the friends or family place new content or postings in the service, the new postings (messages or tweets) may be viewed on the screen while still viewing TV programs. Additional features include viewing content (tweets) of friends and family of people who they are following with a personal account.

In another embodiment, the system, method and user interface will also allow program specific content to be displayed and followed. A method is provided for displaying content or a message from a social networking site including accessing the social networking site in response to a user input, the user input initiated while viewing a program on a display and generating at least one keyword for searching the social networking site based on at least one characteristic associated with the program being viewed.

Figure 10:
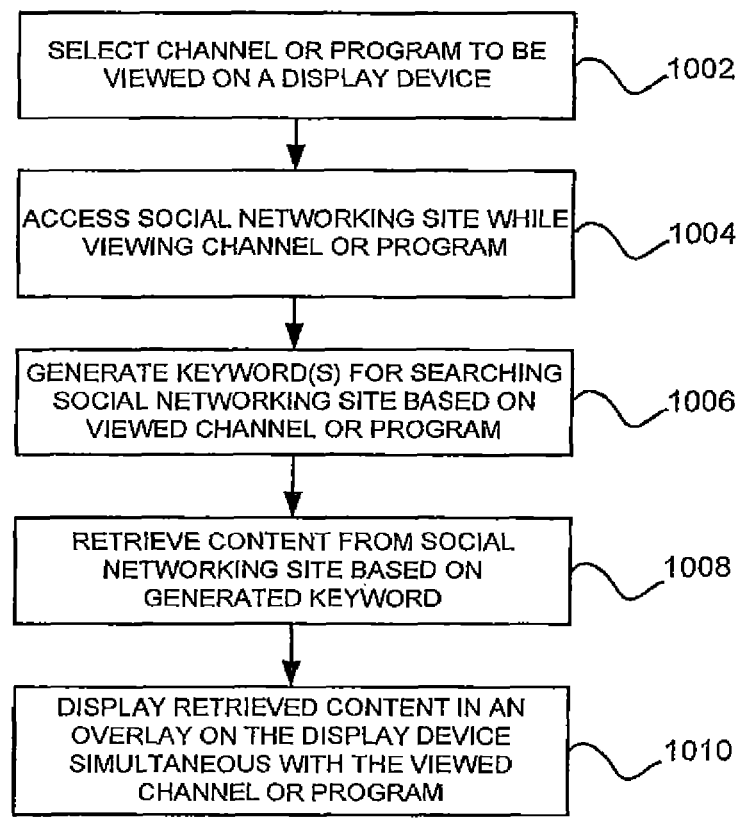
FIG. 10 is a flowchart of an exemplary method for searching for content, e.g., messages, from a social networking system included with an internet site in accordance with an embodiment of the present disclosure.

Referring to FIG. 10, a flowchart of an exemplary method for searching for content, e.g., messages, from a social networking system in accordance with an embodiment of the present disclosure is shown. Initially, in step 1002, a user selects a channel or programmed to be view on the display device 114. The channel or program is selected either via a user input directly into the host device 108 or via a graphic user interface 216 displayed on the display device 114 used in conjunction with remote control device 300. While the user is viewing the selected channel or program, a social networking internet site will be accessed in response to a user input. The host device 108 will provide access to the social networking internet site via the input signal receiver 202.

In step 1006, the controller 214 generates at least one keyword based on the channel or program being viewed and uses the generated keyword to search for content from the social networking internet site. The search information or keyword(s) used for scanning or searching the social network service may be derived from descriptions provided through an electronic program guide (EPG), including stars or celebrities in the program, or descriptions of events. Furthermore, the keyword(s) may be derived from closed caption data, i.e., a transcription of the audio portion of the channel or program being viewed. The content of the actual broadcast station, such as a news service may also be included as a search criteria or keyword. In step 1008, the content, e.g., a message or tweet, is then retrieved from the social networking, or internet, site based the at least one keyword and displayed in an overlay, e.g., user interface 700, on the display device 114 simultaneous with the channel or program being viewed, in step 1010. As a result, the system and method of the present disclosure allows viewing of content (e.g., tweets) of celebrities associated with current programming, content (e.g., tweets) of people and organizations related to current programming, and content (e.g., tweets) of commercial products advertised.

In one example of the search method of the present disclosure, assume a user is watching a talk show and the EPG provided by the service associated to the host device 108 lists at least two celebrity guests appearing on the talk show, e.g., guest 1 and guest 2. The controller 214 will then use the name of guest 1 and guest 2 as keywords for searching the social networking, or internet, site. The content, e.g., messages or tweets, of guest 1 and guest 2 will then be retrieved from the social networking internet site. The identities of guest 1 and guest 2 will then be displayed on the overlay 700 as an element, for example, element 724 and element 730. Depending on which identity is selected as the current identity via user input or by an automatic selection by the controller 214, the content associated to the current identity will be displayed on the overlay 700 as message 702.

In a further example, assume the user is watching a broadcast news program. In the broadcast news program, a particular company or organization is mentioned by the news anchors. The controller 218 will derive the name of the company or organization, e.g., company ABC, from the closed caption data being provided by the service associated to the host device 108. The controller 214 will then use the name of company, i.e., company ABC, as the keyword for searching the social networking internet site. The host device 108 will then display any content retrieved associated to company ABC and allow further searching into an internet site as described above.

Keyword generation and search may also be performed manually by the user. The user may use the remote control or other keyboard type entry device to type in one or more keywords into an entry screen. Controller 218 then searches these keywords and then display any content retrieved associated to the keywords as described above.

The system and method of the present disclosure may also store additional information related to the social networking content. Some of this additional information may include pictures, account history, social network profiles, that may sometimes be included and may be needed by a user. Additionally, the application may allow linking to other user accounts, identities, or network microblogs through the links or hyperlinks that were included in the text content currently displayed.

As noted above, keywords for social network searching may also be extracted from other video services provided to the host device from the head end, such as the EPG, closed caption data, etc. The user profile in the software application client may allow for the creation of, or maintenance of, a priority list. The priority list may permit scanning of a list of "likely" identities or accounts associated to keywords found in the program guide or other program descriptions, in addition to scanning for predetermined identities selected by the user. For example, assume the user is watching a particular show, e.g., Oprah. The first tier of the user's priority list would be their user profile (whoever the user is following is always shown in the list, i.e., at least one predetermined identity or account). Next, the second tier would include keywords like The Oprah Show, Oprah Winfrey. Then, the program, i.e., Oprah, might also have a guest or a topic, which would be added to the third tier.

As content is retrieved from each tier of the search, the controller 214 will prioritize the content and display the content in the overlay 700. In one embodiment, the content is prioritized and the identities associated to the prioritized content are sorted in order in the second carousel with the identity having the highest priority being represented as the current identity 724. The remaining prioritized identities will be queued up in the second carousel as next identities. For example, referring to FIG. 7, a result of the first tier search will be represented by element 724, a result of the second tier search will be represented by element 730 and a result of the third tier search will be represented by element 732. In this manner, all of the retrieved content is displayed and available to the user in a defined manner, i.e., according to the priority list.

It is to be appreciated that the priority list may be defined by a user setting or by the controller 214 based on usage patterns of the user. For example, as the user changed channels, more and more topics would be added to the priority list, but, in one embodiment, the user's settings would always take priority and stay in the list. Additionally, as items became outdated they would be removed from the priority list (i.e., user is watching adult-oriented programming, e.g., entertainment sports programming network (ESPN), now instead of child-oriented programming, e.g., the Disney channel).

The user profile may also include an interactive keyword selection process, based on the electronic program guide or other descriptions. The user profile may also allow keyword analysis and selection of keywords found in the currently stored downloaded social network content in the host client. The application may present keywords in a mapping structure, using entries such as "follow like" or "search further like" for keyword association. The keyword search of content may be invoked based on words found in the currently displayed message, allowing quick access to a "breadcrumb trail" of similar content either stored within the host device or alternately available and accessible through the social network service. For example, assume the user is watching a football game, e.g., the Colts playing the Patriots on ESPN. Possible topics would be Roster, Schedule, Injuries. The user selects Schedule, and a list of teams is populated. From there the user can find more information about those teams, all through embedded links. For instance, the user may go back to the start page and select Roster. The user is then presented with topics such as Manning, Clark, and Saturday. Additionally, the software application client would remember what the user was interested in, to more quickly populate the list in the future. For instance, the next time the user was watching the Colts, the selections might be slightly different, such as Schedule, Colts versus Ravens, Manning, Clark, and Saturday.

It is to be appreciated the mapping structure is mostly text based due to the size of the user interface, and in one embodiment, may include a string of tags presented below the currently displayed message, for example:

colts patriots roster schedule injuries manning clark saturday

In other embodiments, the mapping structure for selecting further content may be a visual mapping structure showing how the content is linked enabling the user to select a particular path to follow.

The system and method of the present disclosure may also allow direct advertising to viewers, through the linking of the social networking service with the television programming content. The feature may include the use of conditional profiles when initializing or updating the service. The software application client may identify a link to an advertising service and may provide the content directly to the user as a message or tweet, or may alternately provide the advertisement to the screen outside the graphical user interface. Such an advertising structure, particularly related to the text display within the graphical interface as a message or tweet, may provide an effective product advertising tool to reach consumers while viewing programs.

Although embodiments which incorporate the teachings of the present disclosure have been shown and described in detail herein, those skilled in the art can readily devise many other varied embodiments that still incorporate these teachings. Having described preferred embodiments of a system and method for enabling a user to display and interact with a social networking structure on a video device connected to a network enabled host device (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for retrieving messages from a networking site, comprising:
 receiving data associated with a video program;
 accessing the networking site in response to a user input, the user input initiated while the video program is being output to a display device;
 generating at least one keyword from the received data, the at least one keyword used for creating a list of identities to follow on the networking site, each identity in the list of identities to follow having an account with the networking site, the account associated with at least one of an actor, an athlete, a celebrity and a company;
 retrieving from the networking site a message posted to the networking site by an identity to follow, the identity to follow being a current identity to follow selected from the list of identities;
 outputting the list of identities to follow in a first display arrangement simultaneous with the program; and
 outputting at least one retrieved message in a second display arrangement simultaneous with the program, the at least one retrieved message associated to the current identity to follow.

2. The method of claim 1, wherein the keyword is derived from a description of the program provided in an electronic program guide.

3. The method of claim 1, wherein the keyword is at least one of an actor performing in the video program, an organization related to the program, and a commercial product advertised during the program.

4. The method of claim 1, further comprising generating at least one second keyword based on at least one of a program channel being recorded, a program channel in the user's favorite list, and content in the at least one retrieved message.

5. The method of claim 1, further comprising:
 outputting the generated at least one keyword in addition to the at least one retrieved message;
 selecting the generated at least one keyword to generate at least one second keyword, the at least one second keyword is associated to similar content as for the generated at least one keyword; and
 outputting the at least one second keyword for display.

6. The method of claim 1, further comprising:
 retrieving additional content from a predetermined identity selected by the user; and
 outputting the additional content in the overlay for display on the display device with the at least one retrieved message based on the at least one keyword.

7. The method of claim 1, wherein the list of identities is prioritized based on at least one of program usage patterns of a user and a user setting.

8. The method of claim 1, wherein the list of identities to follow and the at least one retrieved message is output to the display device.

9. A system for retrieving messages from a networking site, comprising:
 a receiver that receives data associated with the video program, the receiver further accessing the networking site in response to a user input, the user input initiated while the video program is being output to the display device;
 a controller, coupled to the receiver, that generates at least one keyword from the received data, creates a list of identities to follow on the networking site based on the at least one keyword, each identity in the list of identities to follow having an account with the networking site, the account associated with at least one of an actor, an athlete, a celebrity and a company and the controller further retrieves from the networking site a message posted to the networking site by an identity to follow on the networking site based on the at least one keyword, the identity to follow being a current identity to follow selected from the list of identities; and
 a display interface, coupled to the controller, that outputs the list of identities to follow in a first display arrangement simultaneous with the program and outputs at least one retrieved message in a second display arrangement simultaneous with the program, the at least one retrieved message associated to the current identity to follow.

10. The system of claim 9, wherein the keyword is derived from a description of the program provided in an electronic program guide.

11. The system of claim 9, wherein the keyword is at least one of an actor performing in the video program, an organization related to the program, and a commercial product advertised during the program.

12. The system of claim 9, wherein the controller generates at least one second keyword based on at least one of a program channel being recorded, a program channel in the user's favorite list, and content in the at least one retrieved message.

13. The system of claim 9, wherein the display interface outputs the generated at least one keyword in addition to the at least one retrieved message, the system further comprising a user interface coupled to the controller, that facilitates selecting the generated at least one keyword, the controller further generating at least one second keyword based on the selection from the user interface, wherein the at least one second keyword is associated to similar content as for the generated at least one keyword, and wherein the display interface outputs the at least one second keyword.

14. The system of claim 9, wherein the controller retrieves additional content from a predetermined identity selected by the user and the display interface displays the additional content in the overlay with the at least one retrieved message based on the at least one keyword.

15. The system of claim 9, wherein the list of identities is prioritized based on at least one of program usage patterns of a user and a user setting.

16. The system of claim 9, wherein the display interface outputs the list of identities to follow and the at least one retrieved message to the display device.

17. A non-transitory machine readable storage medium containing program instructions for causing a machine to perform a method for retrieving messages from a networking site, the method comprising:
 receiving data associated with a video program;
 accessing the networking site in response to a user input, the user input initiated while the video program is being output to a display device;
 generating at least one keyword from the received data, the at least one keyword used for creating a list of identities to follow on the networking site, each identity to follow having an account with the networking site, the account associated with at least one of an actor, an athlete, a celebrity and a company;

retrieving from the networking site a message posted to the networking site by an identity to follow, the identity to follow being a current identity to follow selected from the list of identities;

outputting the list of identities to follow in a first display arrangement simultaneous with the program; and outputting at least one retrieved message in a second display arrangement simultaneous with the program, the at least one retrieved message associated to the current identity to follow in the first display arrangement.

18. The non-transitory machine readable storage medium of claim 17, wherein the keyword is derived from a description of the program provided in an electronic program guide.

19. The non-transitory machine readable storage medium of claim 17, wherein the keyword is at least one of an actor performing in the video program, an organization related to the program, and a commercial product advertised during the program.

20. The non-transitory machine readable storage medium of claim 17, further comprising generating at least one second keyword based on at least one of a program channel being recorded, a program channel in the user's favorite list, and content in the at least one retrieved message.

21. The non-transitory machine readable storage medium of claim 17, further comprising:
  displaying the generated at least one keyword in the overlay in addition to the at least one retrieved message;
  selecting the generated at least one keyword to generate at least one second keyword, the at least one second keyword is associated to similar content as for the generated at least one keyword; and
  outputting the at least one second keyword for display on the display device.

22. The non-transitory machine readable storage medium of claim 17, further comprising: retrieving additional content from a predetermined identity selected by the user; and outputting the additional content in the overlay for display on the display device with the at least one retrieved message based on the at least one keyword.

23. The non-transitory machine readable storage medium of claim 17, wherein the list of identities is prioritized based on at least one of program usage patterns of a user and a user setting.

24. The non-transitory machine readable storage medium of claim 17, wherein the list of identities to follow and the at least one retrieved message is output to the display device.

* * * * *